(12) United States Patent
Merzhaeuser et al.

(10) Patent No.: US 11,162,476 B2
(45) Date of Patent: Nov. 2, 2021

(54) WIND TURBINE ROTOR BLADE PRE-STAGED FOR RETROFITTING WITH A REPLACEMENT BLADE TIP SEGMENT

(71) Applicant: General Electric Company, Schenectady, NY (US)

(72) Inventors: Thomas Merzhaeuser, Munich (DE); Dominic Alexander Von Terzi, Forstern (DE)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 16/174,781

(22) Filed: Oct. 30, 2018

(65) Prior Publication Data

US 2020/0132054 A1    Apr. 30, 2020

(51) Int. Cl.
*F03D 1/06* (2006.01)
*F03D 80/50* (2016.01)
*F03D 80/30* (2016.01)

(52) U.S. Cl.
CPC .......... *F03D 80/50* (2016.05); *F03D 1/0675* (2013.01); *F03D 1/0683* (2013.01); *F03D 80/30* (2016.05); *F05B 2230/80* (2013.01); *F05B 2240/302* (2013.01)

(58) Field of Classification Search
CPC ........ F03D 1/001; F03D 1/0675; F03D 80/30; F03D 1/065
See application file for complete search history.

(56) References Cited

U.S. PATENT DOCUMENTS

| 7,654,799 | B2 * | 2/2010 | Eyb | F03D 80/00 416/229 R |
| 8,177,515 | B2 * | 5/2012 | Hibbard | F03D 1/0675 416/226 |
| 8,182,731 | B2 * | 5/2012 | Bakhuis | F03D 1/0633 264/275 |
| 8,231,351 | B2 * | 7/2012 | Nies | F03D 1/065 416/146 R |
| 8,544,800 | B2 * | 10/2013 | Stuhr | B64C 23/069 244/199.4 |
| 8,746,053 | B2 * | 6/2014 | Brake | F03D 1/0608 73/147 |
| 8,834,130 | B2 * | 9/2014 | Fuglsang | F03D 1/0675 416/248 |
| 9,140,235 | B2 * | 9/2015 | Vossler | F03D 1/0641 |

(Continued)

FOREIGN PATENT DOCUMENTS

| EP | 3144526 A1 | 3/2017 |
| EP | 2957765 B1 | 8/2017 |
| WO | WO-2015051803 A1 * | 4/2015 | ........... F03D 1/0675 |

OTHER PUBLICATIONS

PCT Search Report, dated Feb. 3, 2020.

*Primary Examiner* — Woody A Lee, Jr.
*Assistant Examiner* — Behnoush Haghighian
(74) *Attorney, Agent, or Firm* — Dority & Manning, P.A.

(57) ABSTRACT

A method for manufacturing a wind turbine blade that is pre-staged for subsequent retrofitting with a replacement blade tip segment includes providing the wind turbine blade with a continuous spar structure from a root end to a tip end of the wind turbine blade. At a pre-defined span-wise location, one of a span-wise extending beam structure or span-wise extending receiver section is configured with the spar structure.

7 Claims, 6 Drawing Sheets

(56) References Cited

U.S. PATENT DOCUMENTS

| | | | | |
|---|---|---|---|---|
| 9,765,756 B2* | 9/2017 | Hancock | | F03D 1/0683 |
| 10,443,579 B2* | 10/2019 | Tobin | | F03D 1/0675 |
| 2007/0018049 A1* | 1/2007 | Stuhr | | B64C 23/069 |
| | | | | 244/124 |
| 2007/0253824 A1* | 11/2007 | Eyb | | F03D 1/0675 |
| | | | | 416/223 R |
| 2009/0169390 A1* | 7/2009 | Nies | | F03D 1/065 |
| | | | | 416/223 A |
| 2009/0304507 A1* | 12/2009 | Dehlsen | | F03D 7/0236 |
| | | | | 416/87 |
| 2010/0308794 A1* | 12/2010 | Townsend | | G01L 1/225 |
| | | | | 324/103 P |
| 2011/0020126 A1* | 1/2011 | Glenn | | F03D 1/0675 |
| | | | | 416/223 A |
| 2011/0052403 A1* | 3/2011 | Kawasetsu | | F03D 1/0683 |
| | | | | 416/226 |
| 2011/0081247 A1 | 4/2011 | Hibbard | | |
| 2011/0081248 A1* | 4/2011 | Hibbard | | F03D 1/0675 |
| | | | | 416/226 |
| 2011/0091326 A1* | 4/2011 | Hancock | | F03D 1/0675 |
| | | | | 416/225 |
| 2011/0158788 A1* | 6/2011 | Bech | | F03D 1/0683 |
| | | | | 415/1 |
| 2011/0158806 A1* | 6/2011 | Arms | | F03D 7/043 |
| | | | | 416/31 |
| 2011/0206510 A1* | 8/2011 | Langen | | F03D 1/0675 |
| | | | | 416/61 |
| 2012/0093627 A1* | 4/2012 | Christenson | | F03D 13/10 |
| | | | | 415/1 |
| 2013/0177433 A1* | 7/2013 | Fritz | | F03D 1/0675 |
| | | | | 416/226 |
| 2013/0224032 A1* | 8/2013 | Busbey | | F03D 1/0675 |
| | | | | 416/223 R |
| 2013/0236307 A1* | 9/2013 | Stege | | F03D 7/0228 |
| | | | | 416/1 |
| 2013/0236321 A1* | 9/2013 | Olthoff | | F03D 1/065 |
| | | | | 416/223 R |
| 2013/0307961 A1* | 11/2013 | Puigcorbe Punzano | | |
| | | | | F03D 17/00 |
| | | | | 348/82 |
| 2014/0056715 A1* | 2/2014 | Vossler | | B29C 33/308 |
| | | | | 416/241 R |
| 2014/0286780 A1* | 9/2014 | Lemos | | F03D 80/50 |
| | | | | 416/210 R |
| 2015/0204200 A1* | 7/2015 | Eyb | | F01D 5/282 |
| | | | | 416/230 |
| 2015/0369211 A1* | 12/2015 | Merzhaeuser | | F03D 13/10 |
| | | | | 416/61 |
| 2017/0152834 A1* | 6/2017 | Kamruzzaman | | F03D 1/0633 |
| 2017/0204832 A1* | 7/2017 | Kamruzzaman | | F03D 1/0633 |
| 2017/0284363 A1* | 10/2017 | Harrison | | F03D 1/0675 |
| 2018/0135602 A1* | 5/2018 | Tobin | | F03D 80/30 |

* cited by examiner

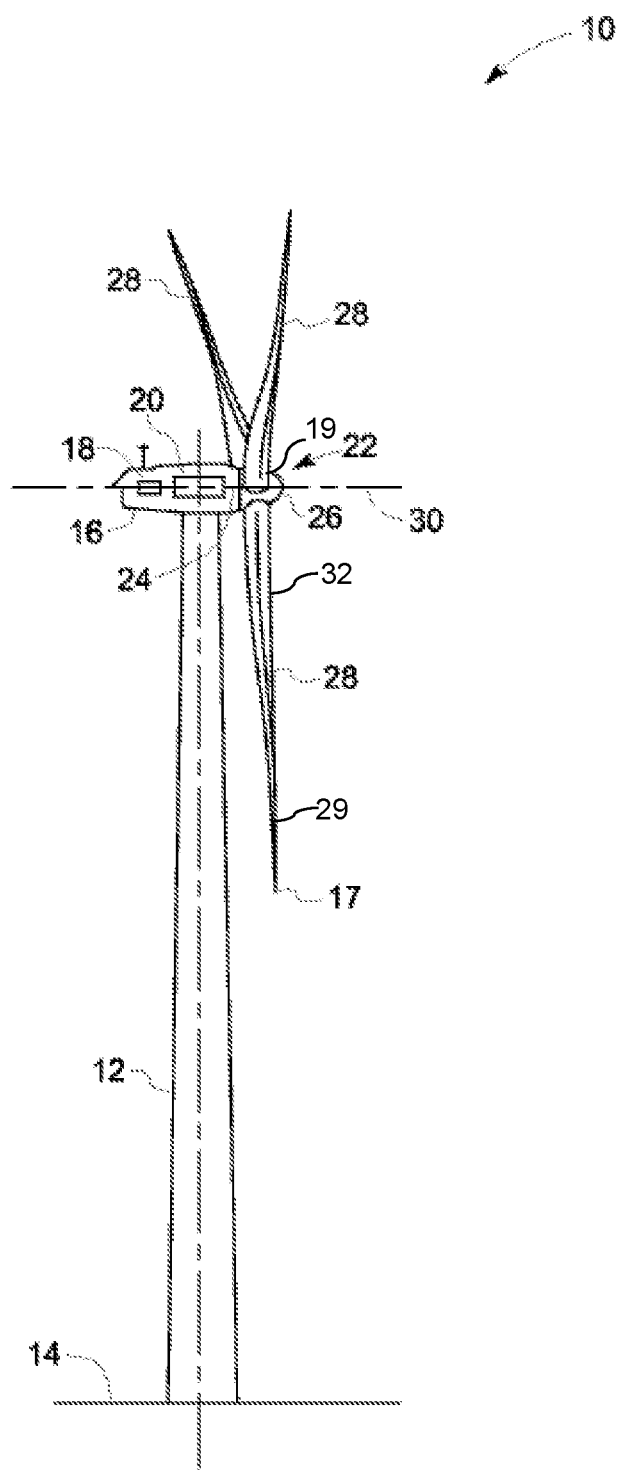
Fig. -1-

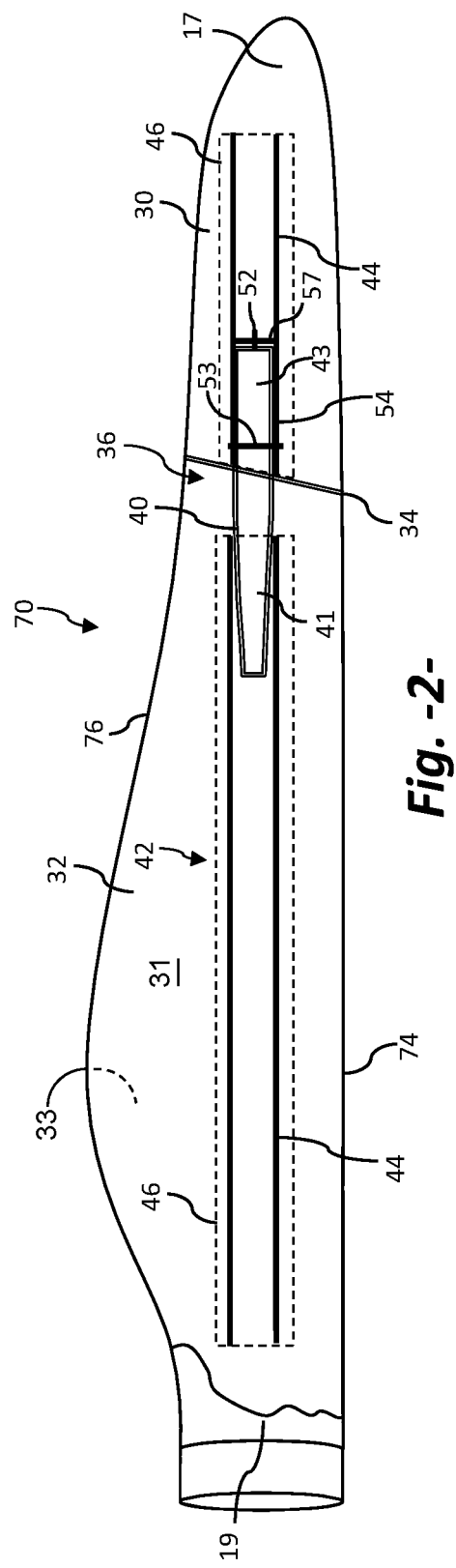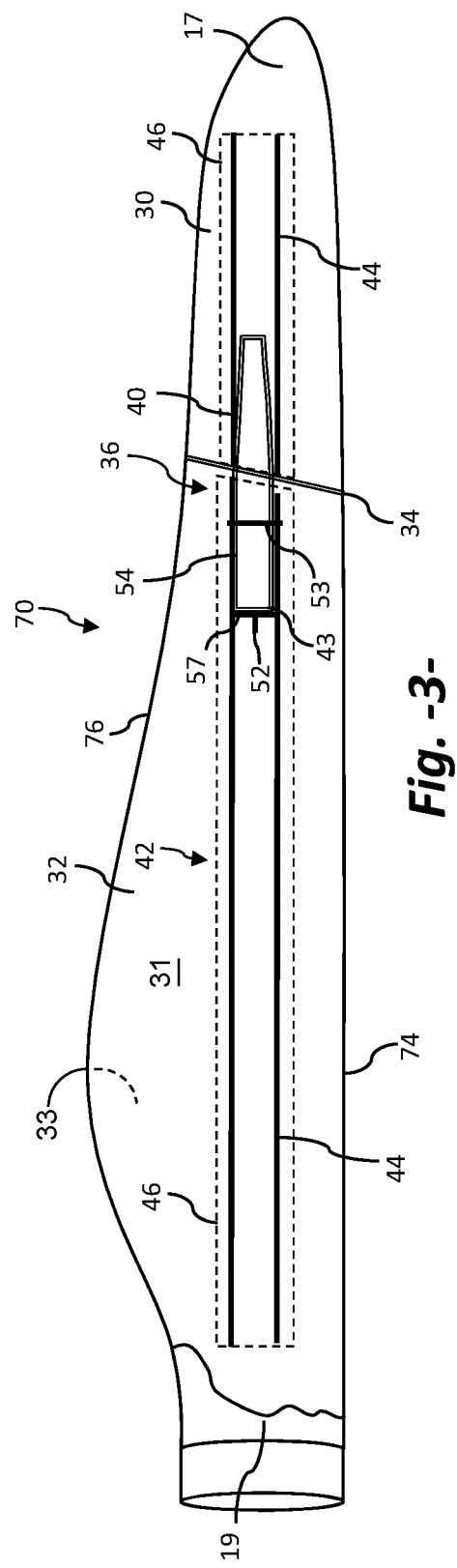

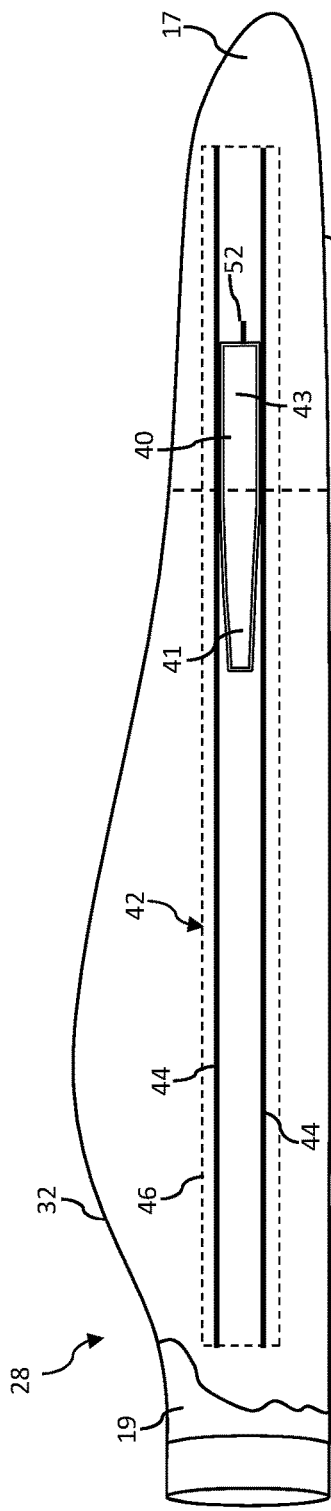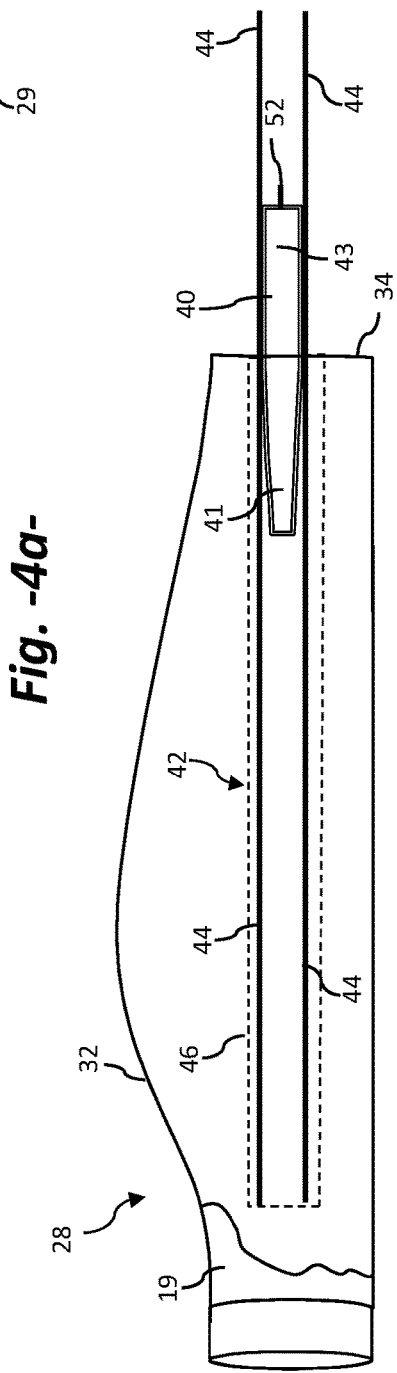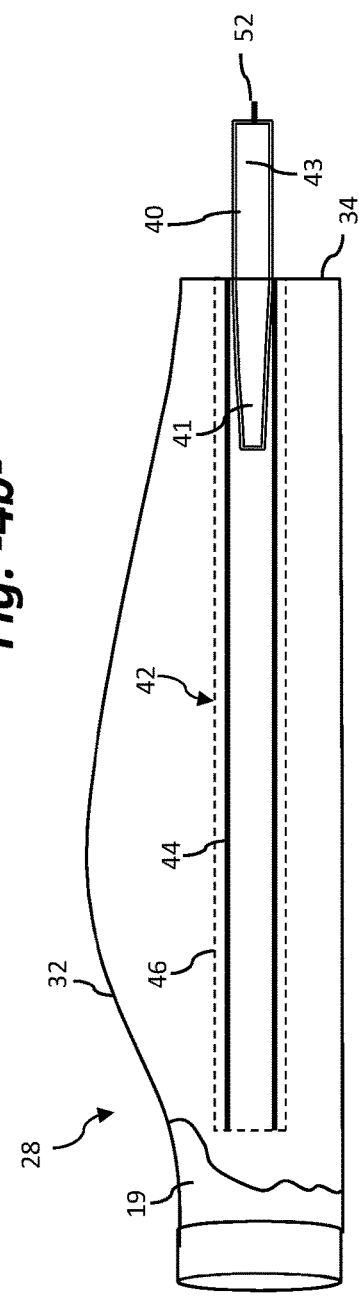

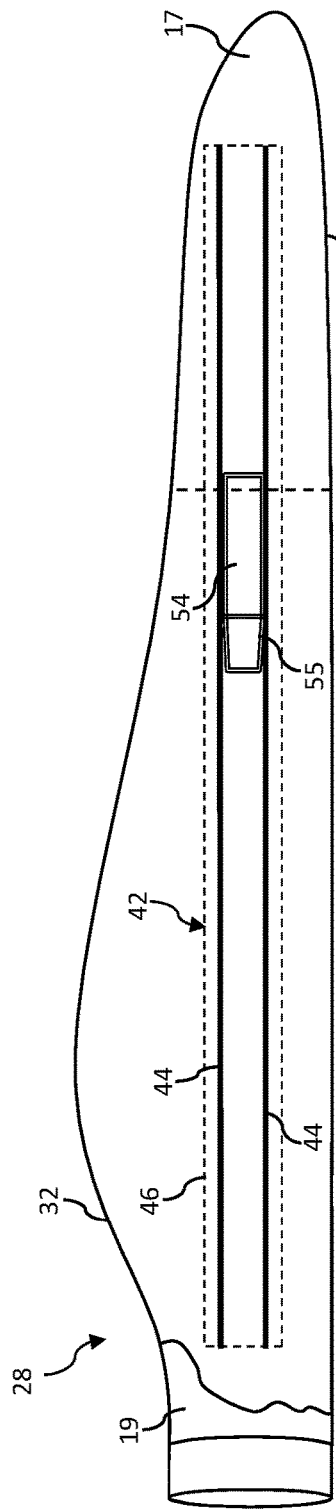
Fig. -5a-
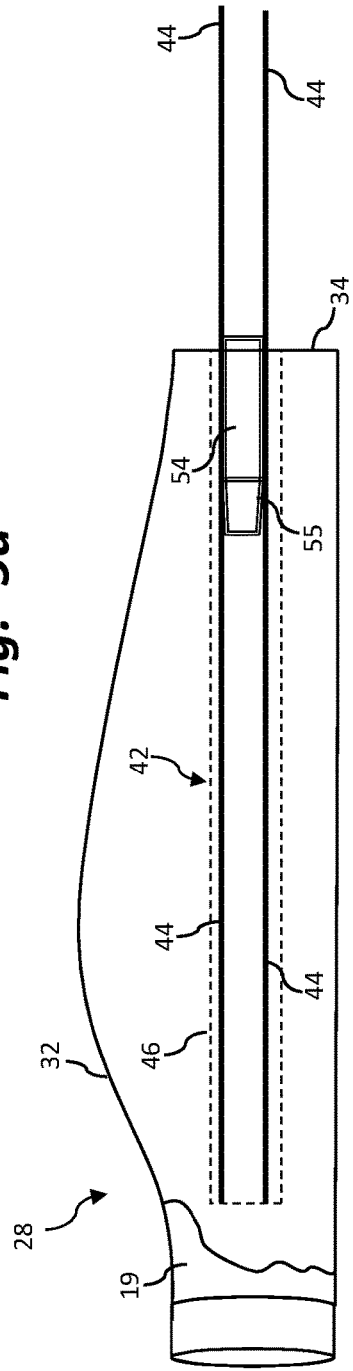
Fig. -5b-
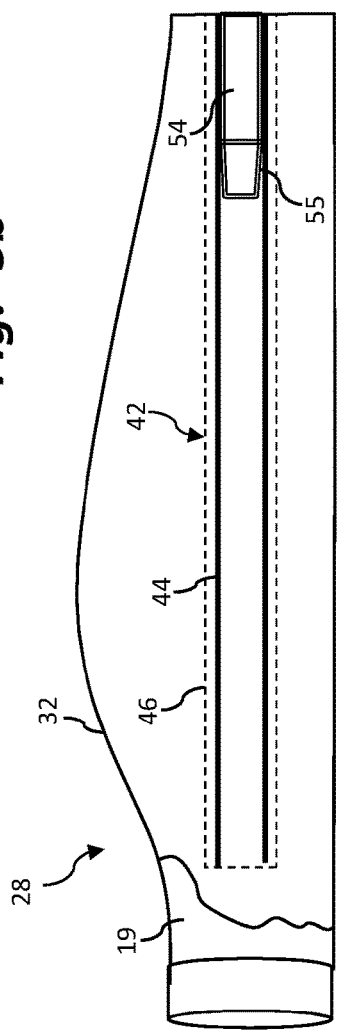
Fig. -5c-

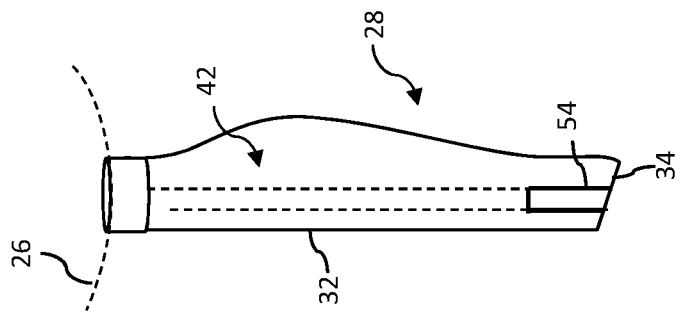
Fig. -6c-
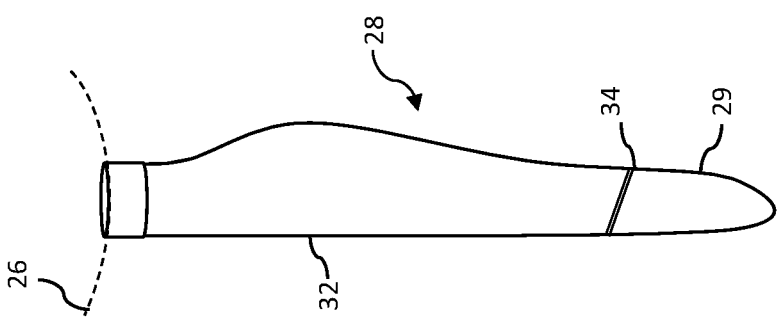
Fig. -6b-
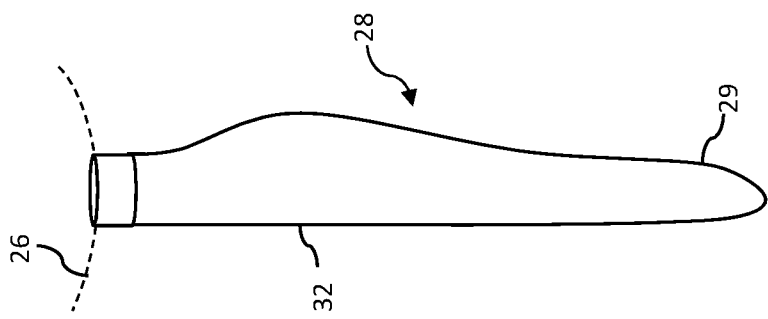
Fig. -6a-

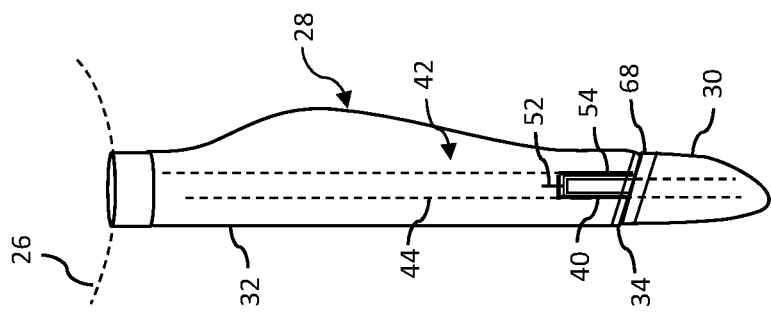
*Fig. -6e-*
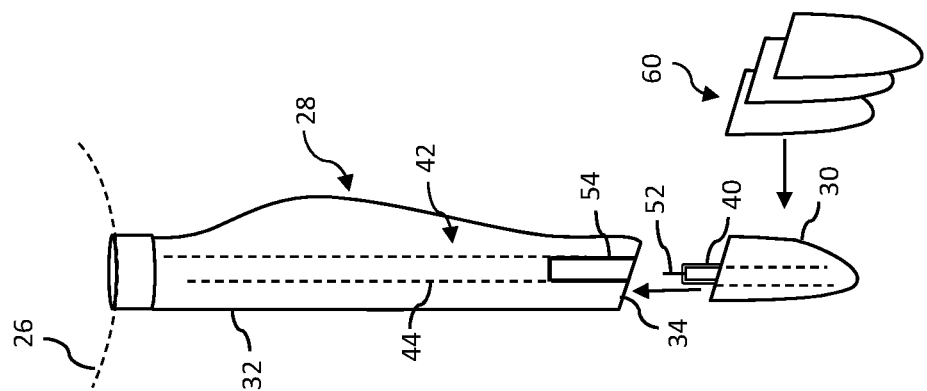
*Fig. -6d-*

WIND TURBINE ROTOR BLADE PRE-STAGED FOR RETROFITTING WITH A REPLACEMENT BLADE TIP SEGMENT

FIELD

The present subject matter relates generally to wind turbine rotor blades and, more particularly, to a method for field retrofit of the existing blade tip segment with a replacement blade tip segment.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance, and strength) which are not configured to withstand the bending moments and other loads exerted on the rotor blade during operation.

In certain situations, it may be desirable to modify a rotor blade on an operational field wind turbine. For example, it may be desired to change the physical characteristics of the blade for noise reduction benefits, or to change the power characteristics of the blade. Such modification may call for replacement of the existing blade tip with a different blade tip segment. However, retrofit of an existing blade tip is a difficult and challenging process, particularly if the process is conducted in the field (at the wind turbine site). In addition, the joint between the replacement blade tip segment and the existing blade root segment typically dictates the maximum load limit for the blade. Thus, retrofitted blade tip segments have been limited to relatively short lengths.

As the size of wind turbine rotor blades have significantly increased in recent years, difficulties have emerged in the integral manufacture as well as conveyance and transport of the blades to a site. In response, the industry is developing sectional wind turbine rotor blades wherein separate blade segments are manufactured and transported to a site for assembly into a complete blade (a "jointed" blade). In certain constructions, the blade segments are joined together by a beam structure that extends span-wise from one blade segment into a receiver section of the other blade segment. Reference is made, for example, to US Patent Publication No. 2015/0369211, which describes a first blade segment with a beam structure extending lengthways that structurally connects with a second blade segment at a receiver section. The beam structure forms a portion of the internal spar structure for the blade and includes a shear web connected with a suction side spar cap and a pressure side spar cap. Multiple bolt joints are provided on the beam structure for connecting with the receiver section in the second blade segment, as well as multiple bolt joints located at the chord-wise joint between the blade segments.

Similarly, US Patent Publication No. 2011/0091326 describes a jointed blade wherein a first blade portion and a second blade portion extend in opposite directions from a joint. Each blade portion includes a spar section forming a structural member of the blade and running lengthways, wherein the first blade portion and the second blade portion are structurally connected by a spar bridge that joins the spar sections.

With the conventional blade structures and retrofitting processes, extensive and time consuming processes are involved in modifying the existing blade to receive the replacement blade tip. The industry would benefit from a wind turbine rotor blade that is "pre-staged" for subsequent retrofitting with a replacement blade tip, wherein such pre-staging involves configuration of spar structure within the blade that may not be necessary to the existing spar structure and is specifically provided to reduce the steps, time, and complexity for retrofitting of the replacement blade tip.

BRIEF DESCRIPTION

Aspects and advantages of the invention will be set forth in part in the following description, or may be obvious from the description, or may be learned through practice of the invention.

In one aspect, the present invention encompasses a method for manufacturing a wind turbine blade that is pre-staged for subsequent retrofitting with a replacement blade tip segment. An embodiment of this method includes providing the wind turbine blade with a continuous spar structure from a root section to a tip section of the blade. This spar structure may include, for example, opposite shear webs and opposite spar caps that define a box-beam spar structure. At a pre-defined span-wise location, one of a span-wise extending beam structure or a span-wise extending receiver section is incorporated with the spar structure by fixing a root-end of the beam structure or receiver section with the spar structure. A tip end of the beam structure or the receiver section is free of (not fixed) the spar structure. The beam structure has a size for insertion into a mating receiver section within the replacement blade tip segment at a later time. Likewise, the receiver section is sized for receipt of a mating beam structure extending from the replacement blade tip segment. In the embodiment wherein the spar structure includes opposite shear webs, the root-end of the beam structure or receiver section may be fixed between the shear webs, for example with an adhesive.

The method may further include retrofitting the wind turbine blade with the replacement blade tip segment at a time subsequent to manufacture of the wind turbine blade by cutting the existing blade tip segment from the wind turbine blade at a chord-wise joint line such that the tip-end of the beam structure extends span-wise from a remaining blade root segment beyond the chord-wise joint line, or the receiver section is exposed at the chord-wise joint line. Spar structure in the blade root segment that extends along the tip-end of the beam structure or receiver section may also be removed such that only the beam structure extends from the blade root segment or the receiver section is exposed at the chord-wise joint line. Then, the replacement blade tip segment is aligned and connected with the blade root segment in a span-wise direction so that the beam structure moves into the receiver section of the replacement blade tip segment, or a beam structure extending from the replacement tip segment slides into the receiver section. A finish surface can then be provided to the blade shell components of the blade root segment and the replacement tip segment at the joint line.

As discussed above, the spar structure may include opposite shear webs, wherein the root-end of the beam structure or receiver section is between and fixed to the shear webs, and wherein the process of removing of the spar structure includes cutting away the shear webs along the tip-end of the beam structure or the tip end of the receiver section.

The wind turbine blade may be operational on a wind turbine at a field site, wherein the method includes removing and lowering the wind turbine bade from a rotor hub of the wind turbine and performing the retrofitting process with the wind turbine blade in a down-tower position relative to the rotor hub.

The method may also include producing and maintaining an inventory of the replacement blade tip segments, wherein for the retrofitting process, one of the replacement blade tip segments is selected from the inventory and transported to the field site.

The invention also encompasses various embodiments of a wind turbine blade that is pre-staged for subsequent retrofitting with a replacement blade tip segment, wherein the blade includes a pressure side shell, and a suction side shell joined to the pressure side shell along a leading edge and a trailing edge such that an interior cavity is defined between the pressure side shell and the suction side shell. A continuous spar structure is configured within the interior cavity from a root end to a tip end of the wind turbine blade. At a pre-defined span-wise location, one of a span-wise extending beam structure or span-wise extending receiver section is configured with the spar structure. The span-wise extending beam structure is configured for insertion into a mating receiver section in a replacement blade tip segment, or the receiver section is configured for receipt of a mating beam structure extending from a replacement blade tip segment.

In a particular embodiment of the wind turbine blade, the beam structure includes a root end fixed to the spar structure and a tip-end that is adjacent and unfixed to the spar structure, wherein the spar structure can be removed from alongside the tip-end of the beam structure when retrofitting the wind turbine blade with the replacement blade tip segment. Alternatively, the section includes a root end fixed to the spar structure such that the receiver section extends at least to a location of a chord-wise joint line where the replacement blade tip segment will be retrofitted.

The spar structure may include opposite shear webs, wherein a root-end of the beam structure or root-end of the span-wise extending receiver section is configured between the shear webs.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine that may utilize a retrofitted blade according to the present disclosure;

FIG. 2 is a view of a pre-staged wind turbine blade hat has been retrofitted with a replacement blade tip segment;

FIG. 3 is a view of a different embodiment of a pre-staged wind turbine blade hat has been retrofitted with a replacement blade tip segment;

FIGS. 4a through 4c are sequential conceptual views of an embodiment for subsequent retrofit of a pre-staged wind turbine blade in accordance with aspects of the present disclosure;

FIGS. 5a through 5c are sequential conceptual views of an alternative embodiment for subsequent retrofit of a pre-staged wind turbine blade in accordance with aspects of the present disclosure; and FIGS. 6a through 6e are sequential conceptual views of an embodiment of a retrofitting process in accordance with aspects of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to methods for manufacturing wind turbine rotor blades (and the resulting blades) that are pre-staged for subsequent retrofitting with a replacement blade tip segment.

Referring now to the drawings, FIG. 1 is a side view of an exemplary wind turbine 10 having a plurality of rotor blades 28 that may be retrofitted in accordance with aspects of the present disclosure. The illustrated wind turbine 10 is a horizontal-axis wind turbine. Alternatively, the wind turbine 10 may be a vertical-axis wind turbine. The wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. The rotor 22 includes a rotatable hub 26, with the rotor blades 28 coupled to and extending outward from the rotatable hub 26. Each rotor blade 28 includes a blade tip 17 and a blade root 19, and corresponding root-end blade segment 32 and a tip-end blade segment 29.

FIG. 2 is a view of a retrofitted wind turbine blade 70 that was made by modifying a pre-staged blade 28 of FIGS. 4a-4c such that the root-end blade segment 32 of pre-staged rotor blade 28 is retrofitted with a replacement blade tip segment 30 that extends in the opposite span-wise direction from a chord-wise joint 34. Each of the blade segments 30, 32 includes a pressure side shell member 31 and a suction side shell member 33. The blade segments 30, 32 are connected by internal joint structure 36 extending into both blade segments 30, 32 to facilitate joining of the blade segments 30, 32, as described in greater detail below. The blade 70 includes a leading edge 74 and a trailing edge 76, as well as the root portion 19 and tip portion 17, with the upper and lower shell member 31, 33 joined together at the leading edge 74 and trailing edge 76. The pre-staged blade 28 and retrofitted blade 70 include an internal cavity in which various structural members, such as spar caps 46 and shear webs 44 are configured. The construction and function of the internal structural components of the blade 70 are well known to those skilled in the art and need not be described in detail herein for an understanding and appreciation of the present invention.

Referring still to FIGS. 2 and 4a-4c, the pre-staged wind turbine blade 28 is provided with a continuous spar structure 42 from the root section 19 to the tip section 17, as with any number of conventional wind turbine blade designs. This spar structure 42 may include, for example, opposite shear webs 44 and opposite spar caps 46 that define a box-beam spar structure 42. At a pre-defined span-wise location, a span-wise extending beam structure 40 is incorporated with the spar structure 42 during fabrication of the pre-staged blade 28 by fixing a root-end 41 of the beam structure 40 with the spar structure 42 and leaving a tip-end 43 of the beam structure 40 essentially unattached to the spar structure 42. As appreciated from FIG. 2, the beam structure 40 has a size for insertion into a mating receiver section 54 within the replacement blade tip segment 30 during the retrofitting process.

In the embodiment of FIGS. 4a-4c wherein the spar structure 42 includes opposite shear webs 44, the root-end 41 of the beam structure 40 may be fixed between the shear webs 44, for example with an adhesive, mechanical means, or any other suitable means. The tip-end 43 of the beam structure 40 may lie adjacent to the shear webs 44, but is unattached to the shear webs 44 so that the shear webs 44 can be easily cut away from the tip-end 43, as depicted in FIGS. 4b and 4c, for subsequent retrofitting with the replacement blade tip segment 30. For this, as discussed above, the shell components 31, 33 of the blade tip segment 29 (pre-staged blade 28) are cut away at a chord-wise joint line 34 such that the tip-end 43 of the beam structure extends span-wise from the remaining blade root segment 32 beyond the chord-wise joint line 34. The spar structure 42 in the blade root section 32 that extends along the tip-end 43 of the beam structure 40 may be removed at the same time or after cutting away of the blade shell components 31, 33 so only the beam structure 40 extends from the blade root segment 32, as depicted in FIG. 4c. Then, the replacement blade tip segment 30 can be aligned and connected with the blade root segment 32 in the retrofitting process wherein the tip-end 43 of the beam structure 40 slides into the mating receiver section 54 of the replacement blade tip segment 30, as seen in FIG. 2.

The embodiment of FIGS. 3 and 5a-5c is drawn to providing the pre-staged wind turbine blade 28 with a pre-staged receiver section 54 having a root end 55 fixed to the spar structure 42. An opposite end of the receiver section 54 extends at least to the chord-wise joint line 34 and may be fixed to the webs 44 along the complete length of the receiver section 54. As depicted in FIGS. 5b and 5c, when the blade tip segment 29 is cut away from the pre-staged blade 28, the spar structure, including the webs 44 and/or are subsequently cut back to the joint line 34. If the receiver section 54 extends beyond the joint line 34 (as depicted in FIG. 5b), then this length of the receiver section 54 may also be trimmed to the joint line 34 such that an open end of the receiver section 54 is exposed at the joint line (FIG. 5c) for receipt of a beam structure 40 that extends from the replacement blade tip segment 30.

FIGS. 6a through 6e sequentially depict an embodiment of the current method for retrofitting a pre-staged wind turbine rotor blade 28 in the field, wherein the blade 28 remains attached in the uptower positon to a rotor hub. Alternatively, the pre-staged wind turbine blade 28 can be removed and lowered from the hub 26 using any suitable process and the retrofitting process is performed with the wind turbine blade 28 in a down-tower position relative to the rotor hub 26.

FIG. 6a depicts the pre-staged rotor blade 28 on the rotor hub 26 at a six o'clock position, the blade 28 including the root-end blade segment 32 and integral blade tip segment 29.

FIG. 6b depicts a chord-wise cut made in the blade 28 at a location that defines a chord-wise joint line 34. With this embodiment, the cut can made completely through the blade 28, wherein the existing blade tip segment 29 is removed, as depicted in FIG. 6c. The remaining spar structure 42 is depicted in the blade root segment 32 (FIG. 6c). In an alternate embodiment wherein the pre-staged blade 28 includes a pre-staged beam structure 40, the cut at the chord-wise joint line 34 would be made through the blade shell components 31, 33 leaving the spar structure 42 (e.g., webs 44 and spar caps 46) essentially intact (as depicted and discussed above with respect to FIG. 5b).

FIG. 6c depicts the blade root segment 32 with the receiver section 54 exposed at the joint line 34.

FIG. 6d depicts selection of one of the preformed replacement blade tip segments 30 from an inventory 60 and span-wise connection of the segment 30 with the blade root segment 32. In particular, as the replacement blade tip segment 30 is moved in the span-wise direction, the beam structure 40 slides into the pre-staged receiver section 54 within the blade root segment 32. To fix the beam structure 40 with the receiver section 54, the end pin 52 on the root end 43 of the beam structure 40 extends through a slot in the wall 57 of the receiver section 54 (FIG. 3), and chord-wise oriented slots in the receiver section 54 align with corresponding slots in the beam structure 40. A chord-wise pin 53 is then inserted through the aligned slots, as particularly seen in FIG. 3.

FIG. 6e depicts the replacement blade tip segment 30 fixed to the blade root segment 32 and the blade shell components provided with a finish at the joint line 34, for example a fiberglass, epoxy or other repair type finish that provides a relatively smooth and aerodynamic surface at the join line 34 between the shell components of the replacement blade tip segment 30 and the root-end blade segment 32. The finish may include a seal band 68 wrapped around the blade shell components 31, 33 at the joint line 34. Thus, the blade in FIG. 6e is a complete retrofitted blade 70 as also depicted in FIG. 3.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing an initial wind turbine blade that is pre-staged for subsequent retrofitting with a replacement blade tip segment, the method comprising:
forming continuous non-segmented pressure and suction side shell components having a tip end and a root end;
forming a spar structure within the pressure side and suction side shell components as a continuous non-segmented structure that extends from the root end to the tip end, wherein forming the spar structure includes:
placing a separate span-wise extending beam structure at a pre-defined span-wise location within the spar structure;
adhesively or mechanically attaching a root-end portion of the beam structure within and to the spar structure and leaving a tip-end portion of the beam structure extending within and unattached to the spar structure; and
wherein in a finished state of the initial wind turbine blade, the spar structure extends continuously and non-segmented from the root end to the tip end of the shell components, the beam structure is housed and extends span-wise within the spar structure with the root-end portion thereof fixedly attached to the spar structure and the tip-end portion thereof extending within and unattached to the spar structure.

2. The method of claim 1, wherein the spar structure includes opposite shear webs, the step of adhesively or mechanically attaching the root end portion of the beam structure within and to the spar structure comprising attaching the root-end portion of the beam structure between and to the shear webs.

3. The method of claim 1, further comprising retrofitting the initial wind turbine blade by fitting the replacement blade tip segment onto a blade root segment of the initial wind turbine blade by:
cutting away the shell components at a chord-wise line located where the unattached tip portion of the beam structure extends within the spar structure;
removing the spar structure from around the unattached tip-end portion of the beam structure such that the unattached tip-end portion of the beam structure is exposed and extends span-wise from the blade root segment of the initial wind turbine blade at the chord-wise line;
aligning and connecting the replacement blade tip segment with the blade root segment in a span-wise direction by moving a mating receiver section formed in the replacement blade tip segment ono the unattached tip-end portion of the beam structure extending from the chord-wise line; and
forming an aerodynamic surface at the chord-wise line between the blade root segment and the replacement blade tip segment.

4. The method of claim 3, wherein the spar structure includes opposite shear webs, the unattached tip-end portion of the beam structure extending along and between the shear webs, and wherein the removing of the spar structure comprises cutting away the shear webs along the unattached tip-end portion of the beam structure.

5. The method of claim 3, wherein the initial wind turbine blade is operational on a wind turbine at a field site, the retrofitting step performed with the initial wind turbine blade in an up-tower position on a rotor hub of the wind turbine.

6. The method of claim 3, wherein the initial wind turbine blade is operational on a wind turbine at a field site, the method further comprising removing and lowering the initial wind turbine bade from a rotor hub of the wind turbine and performing the retrofitting step with the initial wind turbine blade in a down-tower position relative to the rotor hub.

7. The method of claim 3, further comprising producing and maintaining an inventory of the replacement blade tip segments, wherein the retrofitting step comprises selecting and transporting one of the replacement blade tip segments from the inventory to a wind turbine at a field site.

* * * * *